Figure 1:
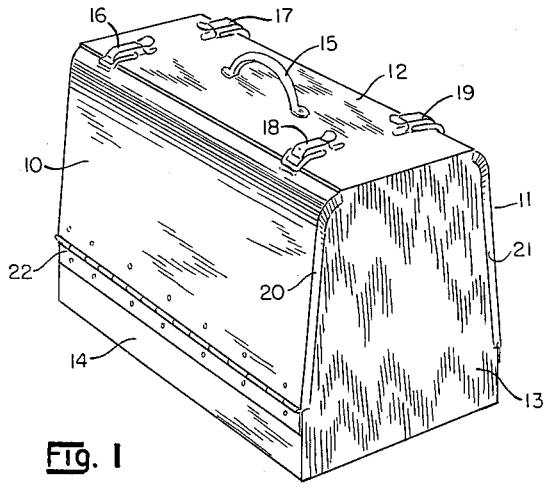

July 31, 1962  H. C. POWELL  3,047,349
CARRIER FOR FISHING TACKLE
Filed April 24, 1959  3 Sheets-Sheet 1

INVENTOR.
Horace C. Powell
BY
ATTORNEY

July 31, 1962 H. C. POWELL 3,047,349
CARRIER FOR FISHING TACKLE
Filed April 24, 1959 3 Sheets-Sheet 2

INVENTOR.
Horace C. Powell
BY
ATTORNEY

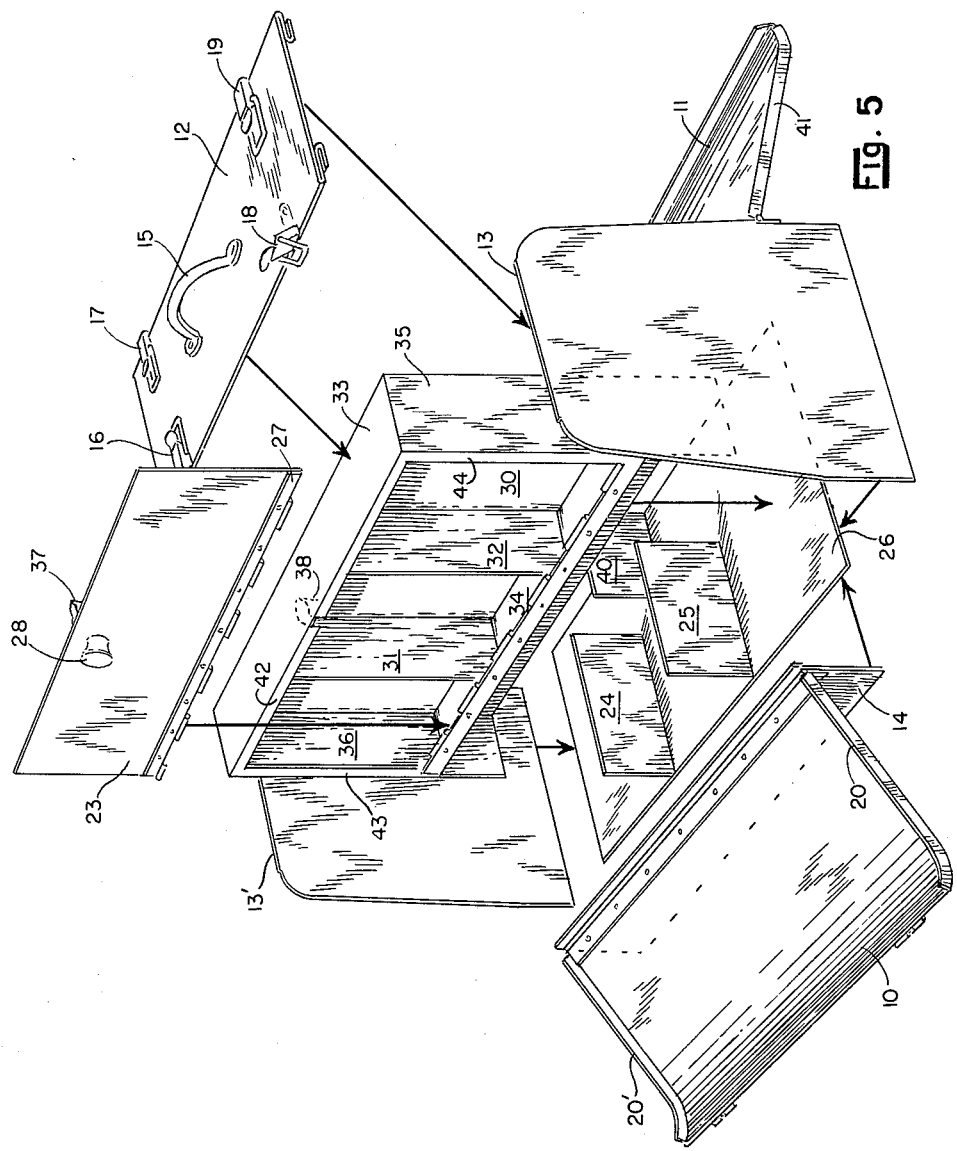

United States Patent Office 3,047,349
Patented July 31, 1962

3,047,349
CARRIER FOR FISHING TACKLE
Horace C. Powell, Rte. 2, Fuquay Springs, N.C.
Filed Apr. 24, 1959, Ser. No. 808,664
2 Claims. (Cl. 312—287)

My invention is concerned with the sport of fishing and relates to a tackle carrier in the form of a handbox for transporting both hooked items of tackle such as lures, flies and snelled lines as well as other items not having hooks attached such as corks, weights, small tools and the like.

In the carrier of my invention, I have chosen to treat that class of fishing tackle items having hooks attached differently from that class of items not having hooks attached and, unlike the common practice of storing all types of tackle items in compartmented horizontal trays, I have provided a novel arrangement of vertical compartments having means for hanging in spaced vertical position those items having hooks attached. As will be noted in the embodiment later described, my invention also provides a number of tray type compartments in which other items such as small tools, corks, weights and the like may be stored.

In a prior pending patent application, Fishing Tackle Carrier, filed March 23, 1959, Serial Number 801,098, now Patent No. 2,987,846, I have disclosed a tackle carrier designed to be carried upright by hand or shoulder strap and in which relatively thin central partition walls within the carrier provide vertical wall space on which hooked items are stored by means of embedding the hooks of such items into material such as cork provided on the face of the walls. This unique system of storage keeps such items in order while at the same time making them readily accessible. While the concept of embedding hooked items in such material has been proposed before in connection with small fly cases, spooner books and the like, as illustrated in United States Patent 1,339,231, issued May 4, 1920 to R. C. Stewart, in all such prior uses, so far as I am aware, the material has not been applied to carrier walls normally disposed upright, which arrangement eliminates the need for anchoring both the hook and the leader end of the hooked items being so handled. That is, the relatively small fly cases and spooner books have no normal position as such. They are apt to be carried in every possible position whereas, in the carrier of my prior application, the structure is such that there is a normal position of the walls on which hooked items are disposed, namely, an upright position. Thus, such items tend to remain in order once hooked in the walls, even while in transit.

In my present invention, I have devised a novel and improved partition and compartment arrangement for a handbox type tackle carrier, in which substantial vertical wall hanging space is provided, as well as tray type storage for holding other items. Many of the advantages of my prior invention have been retained and certain novel features and advantages of the present invention will be made apparent later on in the description.

A principal object is to provide a fishing tackle carrier in which all of the items are stored so as to be readily accessible when needed and in which special provision is made for keeping separate and free from entanglement items having hooks attached.

A more specific object of my invention is to provide a handbox suitable for use as a fishing tackle carrier in which a central partition running longitudinally of the box is formed as a hollow double wall to serve the threefold purpose of dividing the box into two side compartments, furnishing an auxiliary compartment within the partition itself and, finally, providing on the walls making up the partition substantial area particularly for items adapted to being hung by their hooks from such walls.

A further object is to provide an improved fishing tackle carrier meeting the objects previously stated and in which the hanging area for hooked items is furnished in readily accessible locations, which locations nevertheless require a minimum number of outer closures in order to reduce or eliminate the problem of waterproofing the carrier.

Figure 3:
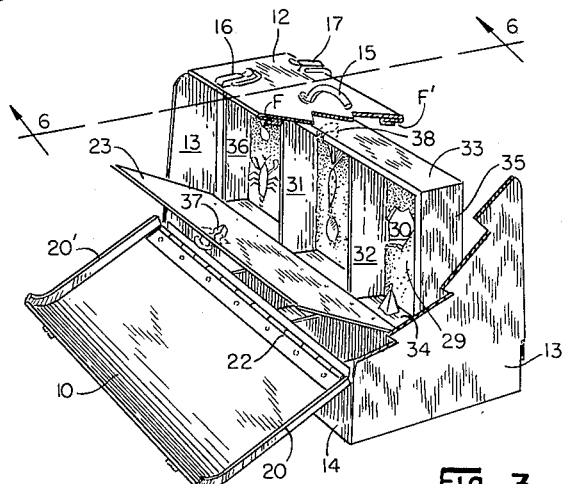
Figure 4:
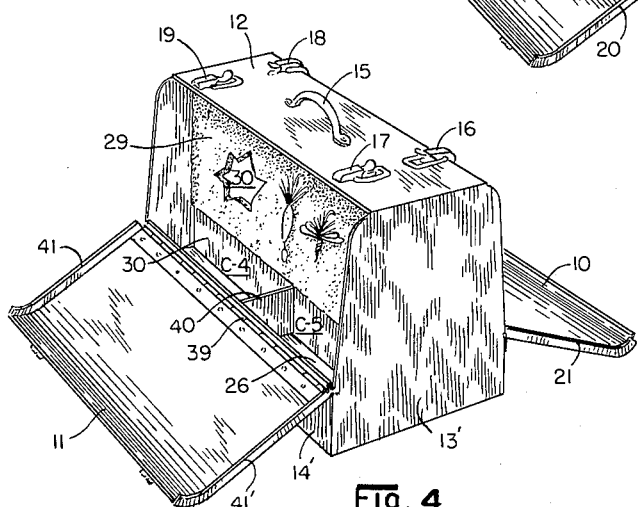
Figure 2:
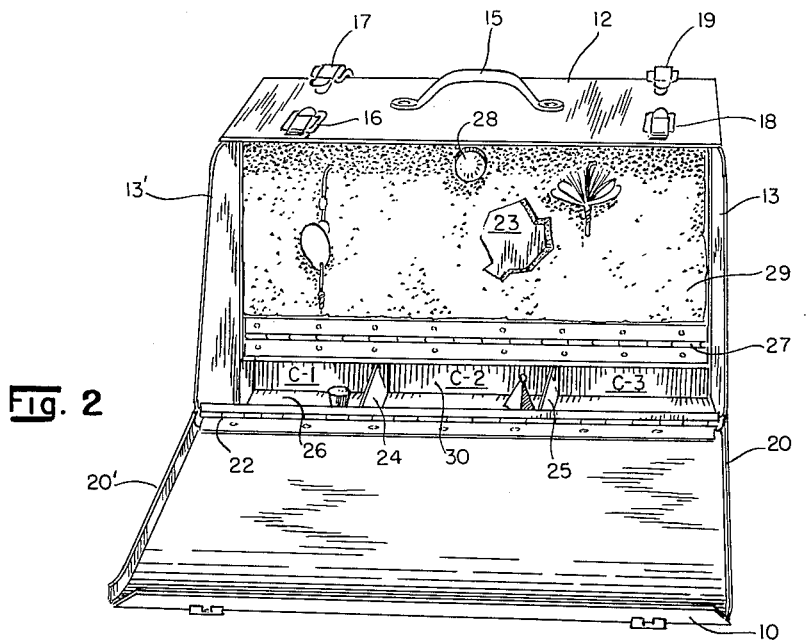
Figure 6:
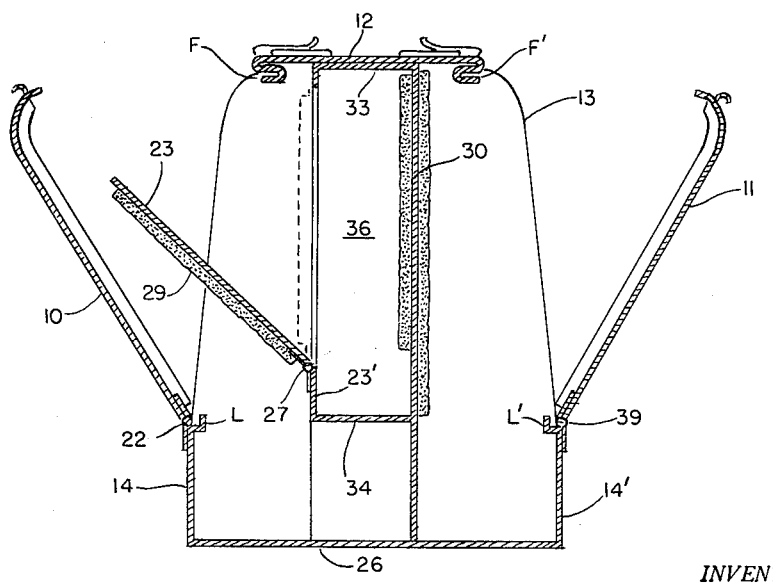

Other objects and advantages will become apparent as the description proceeds in which FIG. 1 is a perspective view of the carrier with the compartment doors or closures in closed position; FIG. 2 is a view taken with one outer compartment door open and looking towards that side of the central partition which serves both as an inner partition wall as well as an inner compartment door; FIG. 3 is similar to FIG. 2 in that the view is taken from the same side of the carrier with both the outer and inner compartment doors on this side being open and showing, in a cutaway view, the arrangement of the central partition; FIG. 4 is a view taken looking at the side opposite to that viewed in FIGS. 2 and 3 and showing the inner partition wall opposite to that viewed in FIGS. 2 and 3; FIG. 5 is an exploded assembly type view showing the relation of the various parts of the carrier to each other; FIG. 6 is a cross-section taken transversely of the view shown in FIG. 3.

In the description to follow, a preferred embodiment of my invention is shown in which each of the components is illustrated as being made of sheet metal, preferably aluminum of suitable gauge and finish, stamped or otherwise bent into the shapes illustrated. Other forms of construction such as molded plastic, castings or the like might be used. However, the construction shown has been proven to be simple to manufacture and inexpensive in cost and, as will be evident to one skilled in the art, many of the various walls hereafter referred to may actually be formed of one piece of metal bent to the desired shapes.

In FIG. 1 a perspective view of the carrier is shown in which the carrier can be seen to resemble a handbox having sloping side covers 10 and 11, a top wall 12, an end wall 13, a fixed side wall 14, a handle 15 and locks 16, 17, 18 and 19. Cover and fixed side wall 14 together form one side of the carrier, cover 10 being a swingable portion of such side. As further illustrated, covers 10 and 11 include edges 20 and 21 overlapping end wall 13, the purpose of edges 20 and 21 being to make the structure water-resistant.

Next proceeding to FIG. 2, cover 10 is shown moved downwardly and outwardly from top wall 12 by means of hinge 22 fastened to the inner face of cover 10 and to the outer face of fixed side wall 14 (as best seen in FIG. 1). Referring further to FIG. 2, there is shown end wall 13' and edge 20' corresponding to end wall 13 and edge 20 respectively of FIG. 1. Within the carrier, a vertical inner wall 23 is seen extending downwardly from beneath top wall 12, the bottom edge of vertical inner wall 23 residing on the top edges of vertical partitions 24, 25 attached to bottom wall 26.

For the purpose of enabling vertical inner wall 23 to be moved outwardly and downwardly, there is provided hinge 27 and pull handle 28. Further, in order that inner vertical wall 23 may be utilized both as an inner compartment door as well as a place on which hooked items may be stored, I have faced inner vertical wall 23 with suitable resilient material 29 such as cork, foam rubber or the like, which may be glued or otherwise attached in place and into which hooks may be embedded. Thus, that class of items such as lures, flies and the like having hooks, may be stored and held in spaced vertical relation by such means. It will also be seen in FIG. 2 that the arrangement provides three traylike compartments, C–1, C–2 and C–3, formed by partitions 24 and 25 and, in compartments C–1 and C–2, I have illustrated by way of example the adaptability of these compartments to the storage of uniform sized items such as corks and weights.

Considering the arrangement shown in FIG. 2 in particular, once the fisherman opens cover 10, he makes accessible any hooked item that might be hung on inner vertical wall 23 as well as any item that is stored in any of the compartments C–1, C–2 or C–3. At the same time, the two classes of items are so separated that they are not apt to become mixed or entangled with each other.

Looking now to FIG. 3, I show inner vertical wall 23 moved as an inner door downwardly and outwardly from its normal position below top wall 12, in which position three additional vertical compartments are revealed. The fact that the partition serves both as a partition and as an inner compartment is an important feature of the invention. These latter compartments are formed by a common vertical back wall 30 and two vertical partitions 31, 32 joined between an inner top wall 33 and an inner bottom wall 34. The partition structure forming these compartments also includes inner end walls 35 and 36. When closed, vertical inner wall 23 is maintained in position by means of a suitable latch having a male portion 37 and a female portion 38, shown in dotted lines. Each of the mentioned inner compartments are faced with the previously described material 29 whereby additional hooked items may be stored thereon. Particularly in the case of items that are individually bulky or that have feathers, hooks, leaders or the like which may become entangled with other items, vertical partitions 31 and 32 considerably assist in keeping such items separate. Protection is also afforded delicate items such as feathered flies since, when placing and removing items in one compartment, there is little likelihood of damaging an item located in an adjacent compartment. Hooked items not requiring such separation may, on the other hand, be stored on inner vertical wall 23.

In FIG. 4, a view is taken of the compartment uncovered by moving door 11 downwardly and outwardly on its hinge 39. In this view, two additional tray like compartments C–4 and C–5 can be seen as being formed by vertical partition 40 resting on bottom wall 26 and running between vertical side wall 14' corresponding to vertical side wall 14 shown in FIGS. 1 and 3, and vertical inner back wall 30, the opposite side of which was previously shown in FIG. 3.

On the side of the vertical inner wall 30 being viewed in FIG. 4, there is shown additional resilient material 29 for the purpose of supporting hooked items in the same manner as previously discussed. That is, with the opening of door 11, the fisherman immediately obtains access to two tray compartments C–4, C–5, suitable for storing uniform sized items, as well as additional vertical inner wall 30 faced with material 29 on which can be hung hooked items. Considerable storage is thus provided for both classes of items, as well as ease of access to the items when stored. In connection with cover 11, as with cover 10, I have provided upturned edges 41 and 41', corresponding to edges 20 and 21 on cover 10, the same being useful in preventing the entrance of water into the interior of the carrier whenever door 11 is closed, such as during a rainstorm.

In FIG. 5, I have illustrated how the various components are assembled before material 29 is applied, in order to show particularly how the central partition structure divides the carrier into two side compartments as well as provide an inner compartment within the partition structure itself, thus providing substantial storage area, all of which is made accessible through only two outer closures, which reduces the problem of making such closures waterproof. Looking first at the overall partition structure, it will be seen that this partition is, in effect, a double wall partition including vertical inner wall 30, extending from top wall 12 to base 26, vertical inner wall 23 serving also as an inner door and extending from top wall 12 to a hinge 27 slightly above base wall 26, the lower portion of vertical inner wall 23 residing on vertical partitions 24 and 25. In order to complete the central partition structure and for strengthening purposes, the partition structure includes in addition to vertical inner walls 23 and 30, inner end walls 35 and 36, extending between top wall 12 and bottom wall 26, inner top wall 33 extending between outer end walls 13 and 13' and inner base wall or horiztonal partition 34. Inner vertical partitions 31 and 32, as previously described, are joined between inner top wall 33 and inner base wall 34, dividing the partition structure into three compartments for the purposes already stated. In forming the central partition structure, I have found it desirable to provide edges 42, 43 and 44 as shown in FIG. 5 for the purpose of providing a bearing surface against which vertical inner wall 23 can be positioned when closed as a door.

In the assembly view of FIG. 5, it will be noticed that the side walls 14, 14' and the lower portions of the end walls 13, 13' form a type of shallow pan. The inner bottom wall 34 above this pan overlies a portion of vertical partitions 24 and 25 providing storage space thereunder and vertical wall 30 separates vertical partition 40 from vertical partitions 24 and 25. By this means, within such pan, the previously mentioned tray compartments C–1, C–2, C–3, C–4 and C–5 are formed, portions of compartments C–1, C–2 and C–3 being beneath inner bottom wall 34. While other pan arrangements might be used, this particular arrangement gives maximum utilization of the space available and provides convenient storage in the pan area for many items commonly used in the sport.

Referring finally to FIG. 6, I have shown in cross-section a view taken along the line 6—6 shown in FIG. 3. In this view, vertical inner wall 30 can be seen to extend from top wall 12 to bottom wall 26 and, in the dotted position, vertical inner wall 23 can be seen to extend between top wall 12 and inner base wall 34. Vertical inner wall 23, in open position, is shown as hinged from a portion of the wall remaining fixed and designated as 23'. For the purpose of making the carrier water-resistant, top wall 12 is preferably formed so as to have edges F, F' interlocking with covers 10 and 11 when such covers are closed and, to assist further in this purpose, side walls 14 and 14' are formed with a slight lip, L and L', as shown in FIG. 6, the same acting to shed water that might attempt to come into the box either through hinge 22 or 39. Thus, edges 20, 20', 41, 41', F, F' and lips L, L' act in combination as a deterrent to the entrance of water into the carrier.

Having thus described my invention, what I claim as new is:

1. A fishing tackle carrier in the form of a rigid structure comprising a rectangular shaped box including a pan like base for storage and having its opposite sides open above said base; a fixed vertical wall acting to vertically partition said box including said base; an L-shaped wall contiguous to said vertical wall, mounted above said base and between the ends of said box whereby to form a second storage pan above said base; a first closure hingedly mounted on said L-shaped wall and closing the space above said base opposite said vertical wall; additional closures hingedly connected to said base and adapted to close opposite sides of the box in substantially wide spaced relation to the first closure and vertical wall thereby allowing vertical hanging storage of the tackle to be effected between the vertical wall and the first closure, between the first closure and the box closure adjacent thereto and between the vertical wall and the box closure adjacent thereto.

2. A fishing tackle carrier as claimed in claim 1 in which portions of the vertical surfaces of said first closure and vertical wall are lined with hook retaining resilient material.

References Cited in the file of this patent

UNITED STATES PATENTS

| | | |
|---|---|---|
| 1,113,832 | Roth | Oct. 13, 1914 |
| 1,359,202 | Smith | Nov. 16, 1920 |
| 2,138,190 | Myers | Nov. 29, 1938 |
| 2,156,740 | Schweigert | May 2, 1939 |
| 2,441,345 | Brubaker | May 11, 1948 |
| 2,558,124 | Burden | June 26, 1951 |
| 2,608,459 | Malmquist | Aug. 26, 1952 |
| 2,711,050 | McIntyre | June 21, 1955 |
| 2,797,137 | Forde | June 25, 1957 |

FOREIGN PATENTS

| | | |
|---|---|---|
| 659,112 | Great Britain | Oct. 17, 1951 |